United States Patent
Herrmann et al.

(10) Patent No.: US 9,126,761 B1
(45) Date of Patent: Sep. 8, 2015

(54) VARIABLE GUIDE SYSTEM FOR SHINGLING IN-STORE ADHESIVE SIGNAGE

(71) Applicant: Xerox Corporation, Norwalk, CT (US)

(72) Inventors: Douglas K Herrmann, Webster, NY (US); Gregory A Ludgate, Williamson, NY (US); Kevin St. Martin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/524,018

(22) Filed: Oct. 27, 2014

(51) Int. Cl.
*B65H 29/00* (2006.01)
*B65G 11/20* (2006.01)
*B65H 29/66* (2006.01)
*B65H 35/00* (2006.01)

(52) U.S. Cl.
CPC .............. *B65G 11/203* (2013.01); *B65H 29/00* (2013.01); *B65H 29/66* (2013.01); *B65H 35/00* (2013.01)

(58) Field of Classification Search
CPC ........ B65G 11/203; B41F 5/24; B65H 29/66; B65H 35/02
See application file for complete search history.

(56) References Cited

U.S. PATENT DOCUMENTS

| | | | | |
|---|---|---|---|---|
| 5,039,083 A | * | 8/1991 | Senn | 271/182 |
| 5,209,809 A | * | 5/1993 | Walter et al. | 156/539 |
| 5,282,614 A | * | 2/1994 | Kalisiak et al. | 271/227 |
| 5,913,656 A | * | 6/1999 | Collins | 414/801 |
| 5,980,196 A | * | 11/1999 | Roth | 414/790.8 |
| 7,624,855 B2 | * | 12/2009 | Martocchio et al. | 198/405 |
| 7,975,416 B2 | | 7/2011 | Engelby et al. | |
| 8,147,643 B1 | * | 4/2012 | Valenti et al. | 156/258 |
| 8,302,338 B2 | | 11/2012 | Engelby et al. | |

* cited by examiner

*Primary Examiner* — Gene Crawford
*Assistant Examiner* — Thomas Randazzo

(57) ABSTRACT

A variable guide system for shingling in-store adhesive signage cards that works with the offset moment/trajectory resulting from some shingling systems by employing multiple adjustable hold downs guides. Adjustments to the hold downs guides are made on the fly by an operator using easily accessible and controllable thumb screws. The thumb screws facilitate side to side movement and angle adjustment of each guide individually in order to prevent jamming of the cards while being shingled at the guides.

20 Claims, 3 Drawing Sheets

VARIABLE GUIDE SYSTEM FOR SHINGLING IN-STORE ADHESIVE SIGNAGE

BACKGROUND

The present disclosure relates to handling adhesive signage card exiting a cutter onto a conveyor at high speeds and in separate shingled sets consisting of 4 rows of 24 cards, and more particularly, to an improved method and apparatus for shingling the separate sets of cards onto the conveyor jam free.

In general, marketing signs for in-store shelving can be either an adhesive type or non-adhesive type. In U.S. Pat. No. 7,975,416 B2, a non-adhesive type marketing sign is shown that includes a free portion, a base portion and a connected portion that couples the base portion to the free portion. The base portion includes an engaging piece and a support piece. The engaging piece is coupled to the support piece of a base bend line and configured to engage with a portion of a product display structure having a price holder. Another marketing sign is shown in U.S. Pat. No. 8,302,338 constructed of sheet material. The sheet material includes a free portion, a base portion and a connecting portion that couples the base portion to the free portion. The base portion includes an engaging piece and a support piece. The engaging piece is coupled to the support piece at a base bend line and configured to engage with a portion of a product display structure having a price holder. The connecting is defined between a first connecting bend line spaced apart from a second connecting bend line by a first distance. The first connecting bend line is adjacent the support piece of the base portion and the second connecting bend line is adjacent the free portion. The first distance substantially corresponds with a top edge thickness of the price holder.

Currently, the present process used to create adhesive signage for store shelving involves applying a PSA (pressure sensitive adhesive) tape to the paper or other substrate and then printing signs on the modified substrate. The media is ~8 mils thick and the adhesive tape is ~10 mils thick leading to a total thickness of roughly 18 mils on one side of the media and 8 mils on the other. This creates an uneven distribution of force as the cards are delivered at a high speed to a downstream conveyor/shingling system. This conveyor/shingling system works by taking cut cards (32 up) from 3 sheets or 96 cards every 3.6 seconds. Systems on the market when supplied are fitted with "shingling" rollers located downstream of a slitter that do not work with the adhesive in-store signage. While rollers may work with flat media, the weight differential caused by the tape creates a moment that spins the cards and affects the flight trajectory of each card causing the cards to pile up in front of the rollers and not shingle consistently. When the cards start to pile up at the rollers, the following cards crash into the leading cards and cause large jams due to the speed of the system. The machine must be shut down for the jam to be removed which is a labored task because cards become tightly wedged in under the rollers before the system can be stopped.

Therefore, there is a need for an improved method and apparatus for shingling the separate sets of cards at a high speed onto a conveyor without jams occurring.

SUMMARY

In answer to this need and disclosed hereinafter is a variable guide system for shingling in-store adhesive signage cards that works to remove an offset moment/trajectory of cards resulting from current shingling systems by employing multiple adjustable hold downs guides. Adjustments are made on the fly by an operator using easily accessible and controllable thumb screw adjustments. Thus, allowing for side to side movement and angle adjustment of each guide individually in order to prevent jamming of the cards as they are shingled at the guides.

BRIEF DESCRIPTION OF THE DRAWINGS

Various of the above-mentioned and further features and advantages will be apparent to those skilled in the art from the specific article or methods described in the example(s) below, and the claims. Thus, they will be better understood from this description of these specific embodiment(s), including the drawing figures (which are approximately to scale) wherein:

DETAILED DESCRIPTION OF THE PREFERRED EMBODIMENT

Figure 1:
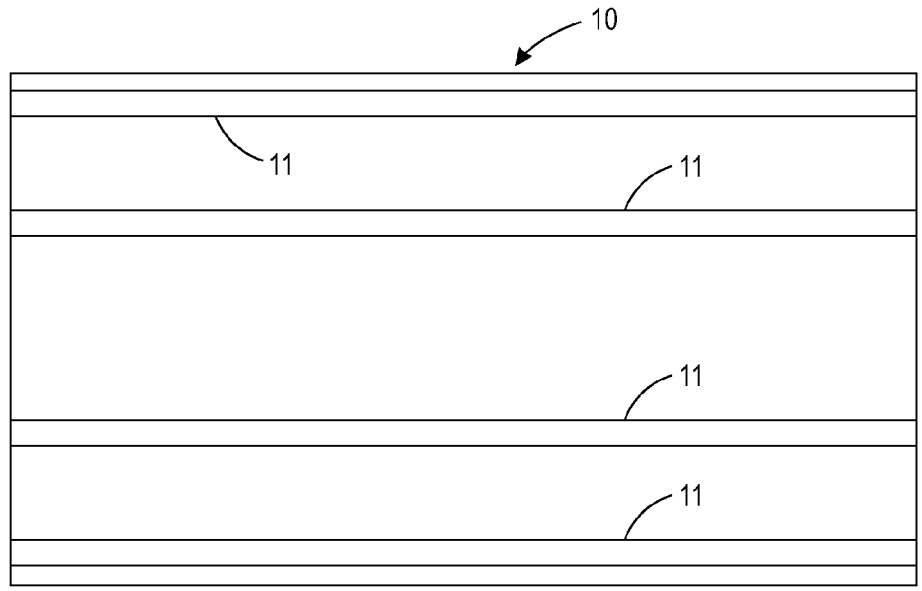
FIG. 1 is a plan view of a paper sheet with dimensioned tape imposition in accordance with the present disclosure.

For a general understanding of the features of the disclosure, reference is made to the drawings. In the drawings, like reference numerals have been used throughout to identify identical elements.

Figure 2:
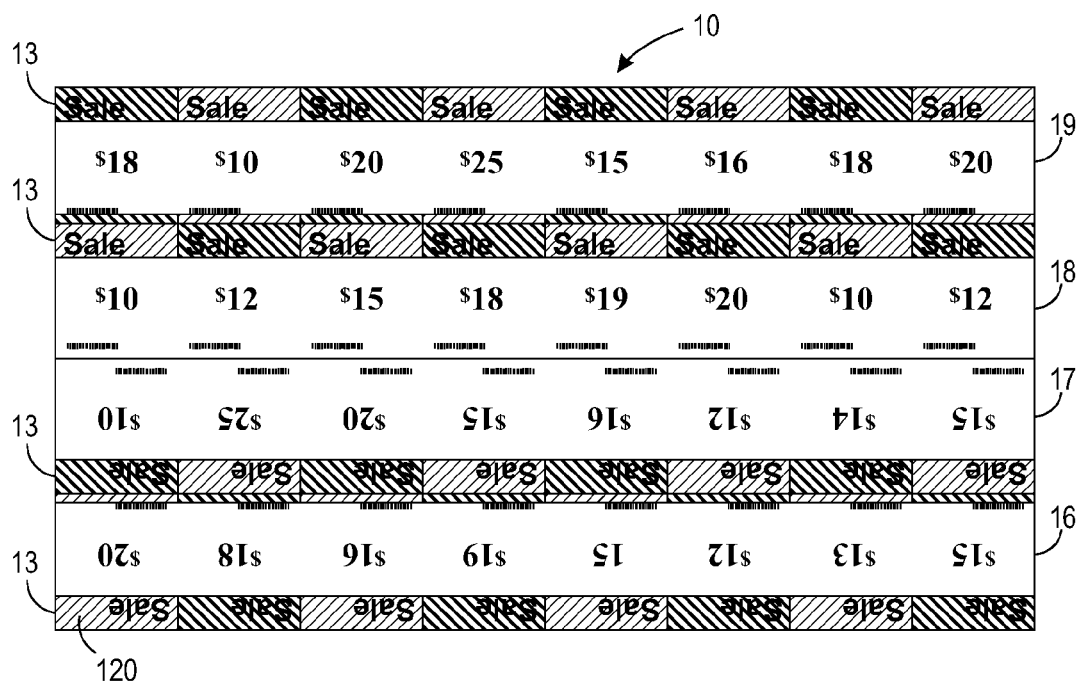
FIG. 2 is a plan view of the paper sheet of FIG. 1 including image imposition.

A media sheet 10 is shown in FIG. 1 that has been customized for a particular signage application using dimensioned tape 11 imposition, and a dimensioned image imposition for use on the custom tape imposition of FIG. 1 is shown in FIG. 2. The taped media imposition 16, 17, 18 and 19 of FIG. 2 orients the PSA (pressure sensitive adhesive) to card color bands 13 of indicia which are imposed in a mirror image tape. That is, indicia in the bottom two rows 16 and 17 on sheet 10 in FIG. 2 are a mirror image of the indicia on the top two rows 18 and 19 due to the placement of PSA tape 11 in rows 16 and 17 in mirror image of placement of PSA tape in rows 18 and 19. This eliminates sheet feeding problems, as well as, the need for a sacrificial tape strip at the bottom of the sheet because a sheet stack of media 10 is approximately level in height due to the dimensioned tape 11 imposition. The dimensioned tape 11 imposition also maximizes the use of each sheet of media 10 by covering the full sheet without the need for a costly and wasteful PSA tape that would ordinarily be needed to even out a stack of sheets. The imposition of tape and cards allows for the system to compile the cards by processing cut cards (32 up) from 3 sheets or 96 cards every 3.6 seconds with a conventional cross process collator.

Figure 3:
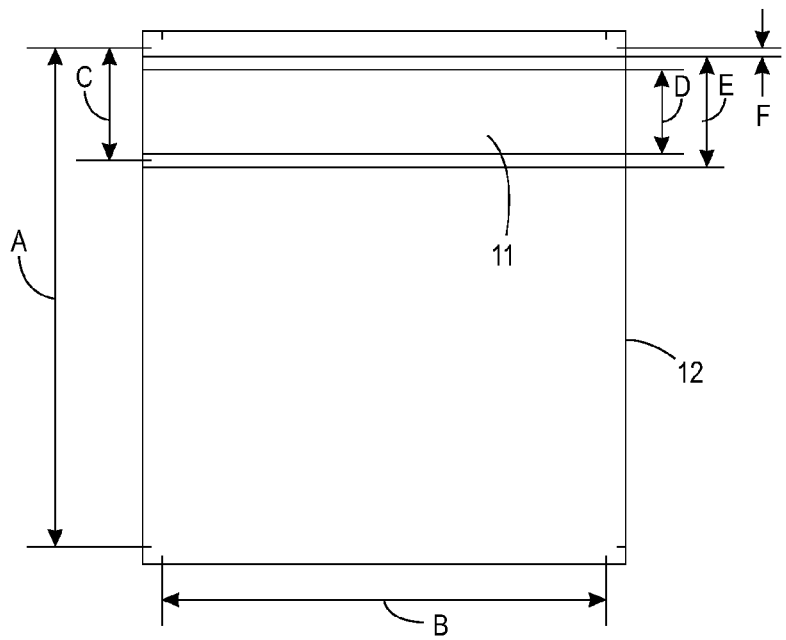
FIG. 3 is a plan view of a customized card produced in accordance with the present disclosure.

An example of a pressure sensitive adhesive taped individual 3×3 inch signage card 12 cut from sheet such as 10 in FIG. 2 is shown in FIG. 3 where: A is the signage sign height of 240 points; B is sign width of 216 points; C indicated the score location down form the trim at 42.29 points; D represents the adhesive tape 11 at 40.5 points; E is an adhesive release liner at 54 points; and F indicates adhesive release liner distance down from trim at 3.65 points. In the figure, 72 points equals 1 inch or 25.4 millimeters and 1 point equals 0.352777778 millimeters.

Figure 4:
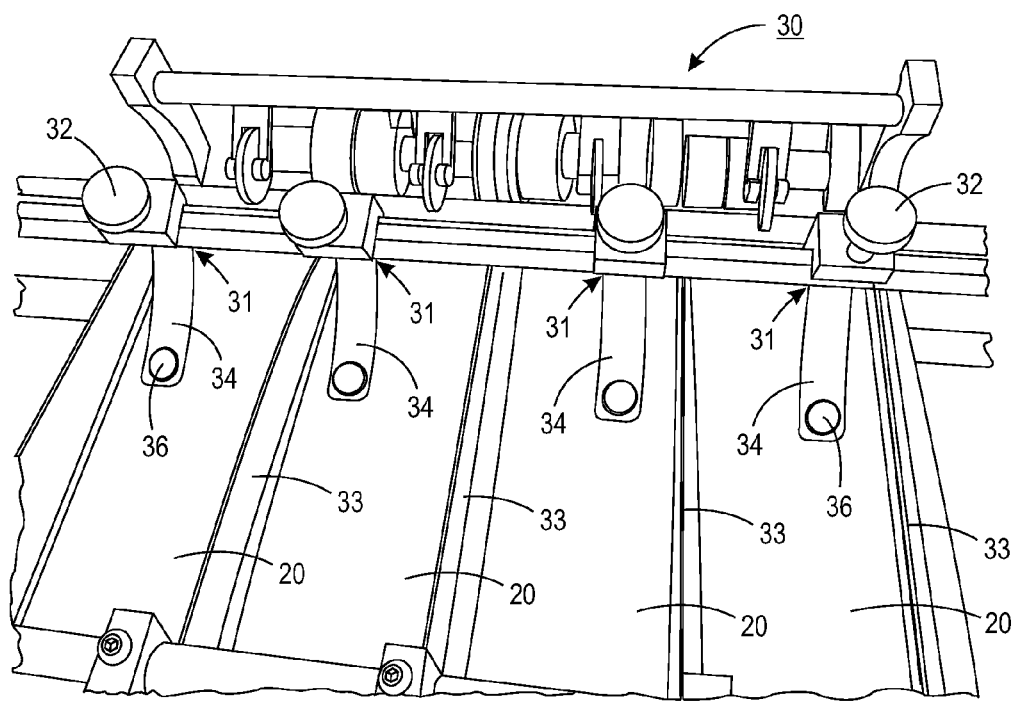
FIG. 4 is top view of hold-down mechanism in a down position.

To meet a demand for a high volume of individual signage cards 12 in FIG. 3 per printing, media sheets are fed from a feeder into a printer with each sheet including PSA taped media imposition. The sheets exit the printer in a process direction into a stop and are then fed orthogonally into a conventional slitter and inline collation system that shingles 4 stacks of 24 cards each onto a conveyor 20. Every three sheets of cards are shingled in sets of 24 in each of the four lanes of chutes. Conveyor 20 is accelerated every three sheets to create an open space between the shingled sets so that the operator knows the four shingled sets contained in the chutes across the conveyor are to be stacked together to make one ninety six card stack. A conventional controller within the printer signals the system when to accelerate. As shown in FIG. 4, and in accordance with the present disclosure, a variable guide system 30 includes a series of four chutes defined by walls 33 that receive individually cut cards 12 from an upstream cutter (not shown) that are held down by a hold-down mechanism 31 positioned within each chute. Cards 12 have a weight differential caused by the weight of the tape 11 and this creates a moment that spins the cards and affects the flight trajectory of each card as it is conveyed. The hold-down mechanism 31 is configured to offset the moment/trajectory weight differential caused by the tape by using 4 adjustable hold downs 31 that include adjustable thumb screws 32 and Mylar strips 34 that are loaded by weights 36. Adjustments are made on the fly by the operator rotating the easily accessible and controllable thumb screw. This allows for side to side movement and angle adjustment of each hold-down mechanism 31 individually. The adjustment is made easily to ensure that the cards do not pile up under Mylar strips 34 and cause a jam or shoot under the Mylar strips themselves. This ensures that the operator can create an evenly shingled set that is separated from the previous and following sets and can be picked up by the operator at high speed.

Figure 5:
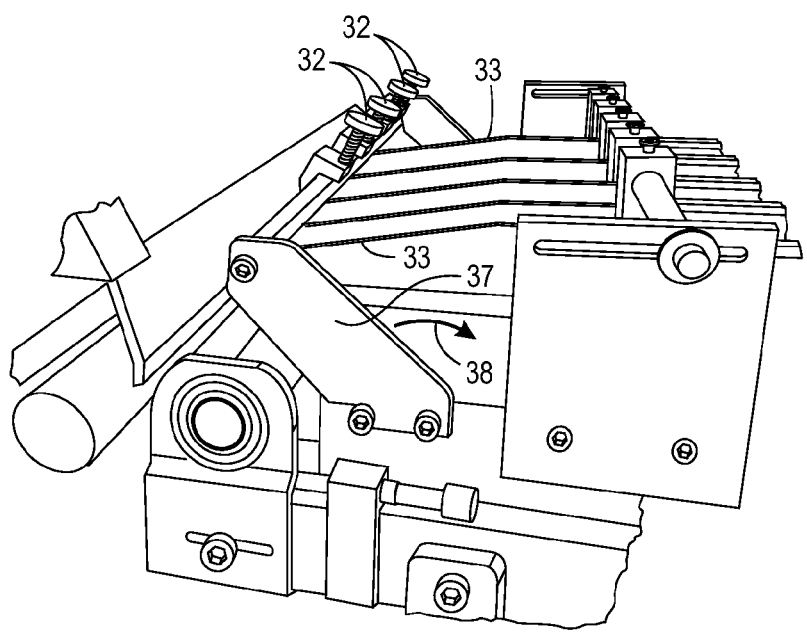
FIG. 5 is an outboard side view of the hold-down mechanism in FIG. 4 showing the hold-down mechanism in a run position.
Figure 6:
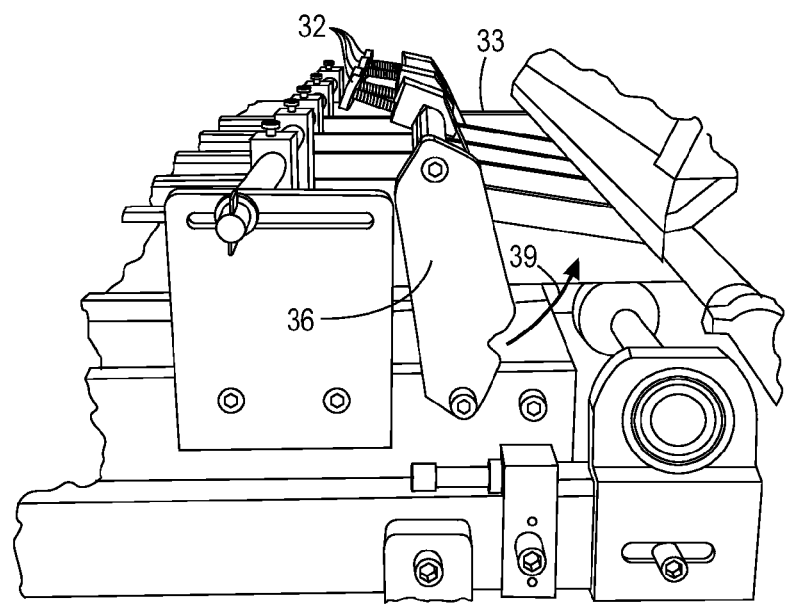
FIG. 6 is an inboard side view of the hold-down mechanism in FIG. 4 showing the hold-down mechanism in an up run position for jam clearance.

Additionally if a jam does occur the hold-down mechanism is rotated out of the way as shown in FIGS. 5 and 6 which allows the cards to freely move out of the slitter system without allowing the cards to become wedged. In FIG. 5, as view from the outboard end of hold-down mechanism 31, a catch member 37 is shown rotated in the direction of arrow 38 into a hold down or RUN position while in FIG. 6 the another catch members 36 is shown from the inboard end of hold-down mechanism 31 rotated in the direction of arrow 39 into an UP or jam clearance position. This system allows adjustment of: the defection angle from the slitter; length of the Mylar strip deflectors; and inboard to outboard location of deflectors and allows these parameters to be changed to optimize the system while the machine is running.

In recapitulation, a system has been disclosed that shingle cards cut from a sheet. Each card includes a PSA (pressure sensitive adhesive) tape on paper as a modified substrate. The cards are fed into four chutes positioned above and working in conjunction with a conveyor in batches of 24 in each chute and held in place and prevented from jamming at the entrance to the conveyor from a slitter by a hold-down mechanism in each chute. The hold-down mechanism is rotatable for jam clearance and is designed to relieve the jam pressure as the cards exit the slitter at high speed. The hold-down mechanism is free to rotate and prevents tight compacting of cards and reduces downtime caused by misfeeds.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A variable guide system for shingling in-store pressure sensitive adhesive taped cards exiting a source, comprising:
   a series of pressure sensitive adhesive taped cards;
   a series of chutes positioned to receive said series of pressure sensitive adhesive taped cards from said source, said series of chutes being separated by a plurality of side walls;
   a series of hold-down devices positioned with respect to and downstream of said chutes to receive said pressure sensitive adhesive taped cards and shingle said pressure sensitive adhesive taped cards thereagainst, said hold-down devices each including a flexible guide having a weight on a remote end thereof and an adjustment mechanism for adjusting the force and angle of said flexible guide to accommodate an uneven thickness of said pressure sensitive adhesive taped cards.

2. The variable guide system of claim 1, wherein said series of hold-down devices are simultaneously rotatable as an assembly for jam clearance and returnable to their original position without effecting original settings of said hold-down devices after a jam has been cleared.

3. The variable guide system of claim 1, wherein said adjustment mechanism includes a screw, and wherein adjustment of said screw allows for side to side movement and angle adjustment of each flexible guide.

4. The variable guide system of claim 3, wherein said screw accommodates on-the-fly adjustment of said flexible guide to ensure that said series of pressure sensitive adhesive taped cards do not pile up and cause a jam.

5. The variable guide system of claim 3, wherein said screw accommodates on-the-fly adjustment of said flexible guide to ensure that said series of pressure sensitive adhesive taped cards are not forced under said plurality of side walls.

6. The variable guide system of claim 1, including inboard and outboard catch members, and wherein said series of hold-down devices are held against rotational movement by rotating said inboard and outboard catch members in a clockwise direction and in a counter-clockwise direction to lift said hold-down devices.

7. The variable guide system of claim 5, wherein said screw is used to adjust the deflection angle of said pressure sensitive adhesive taped cards entering said series of chutes.

8. The variable guide system of claim 7, wherein said pressure sensitive adhesive taped cards include a top portion and a bottom portion with an adhesive strip across on only said top portion thereof.

9. The variable guide system of claim 8, wherein said flexible guide is a Mylar strip.

10. The variable guide system of claim 1, wherein said adjustment mechanism facilitates adjusting the length of said flexible guide.

11. A method for shingling in-store pressure sensitive adhesive taped cards exiting a source, comprising:
    providing a series of pressure sensitive adhesive taped cards;
    providing series of chutes positioned to receive said series of pressure sensitive adhesive taped cards from said source, said series of chutes being separated by a plurality of side walls; and providing series of hold-down devices positioned with respect to and downstream of said chutes to receive said pressure sensitive adhesive taped cards and shingle said pressure sensitive adhesive taped cards thereagainst, said hold-down devices each including a flexible deflector having a weight on a remote end thereof and an adjustment mechanism for adjusting the force and angle of said flexible strips to accommodate an uneven thickness of said pressure sensitive adhesive taped cards.

12. The method of claim 1, including providing said series of pressure sensitive adhesive taped cards in shingled sets within said series of chutes and creating a predetermined space between said shingled sets of said pressure sensitive adhesive taped cards in response to a signal from said source.

13. The method of claim 1, including providing said adjustment mechanism as a screw, and wherein adjustment of said screw allows for side to side movement and angle adjustment of each flexible deflector.

14. The method of claim 13, including accommodating on-the-fly adjustment of said flexible deflector with said screw to ensure that said series of pressure sensitive adhesive taped cards do not become jammed.

15. The method of claim 13, wherein said screw accommodates on-the-fly adjustment of said flexible deflector to ensure that said series of pressure sensitive adhesive taped cards are not forced under said plurality of side walls.

16. The method of claim 11, including providing inboard and outboard catch members, and wherein said series of hold-down devices are held against rotational movement by rotating said inboard and outboard catch members in a clockwise direction and in a counter-clockwise direction to lift said hold-down devices.

17. The method of claim 15, wherein said screw is used to adjust the deflection angle of said pressure sensitive adhesive taped cards entering said series of chutes.

18. The method of claim 17, wherein said pressure sensitive adhesive taped cards include a top portion and a bottom portion with an adhesive strip across on only said top portion thereof.

19. The method of claim 11, including cutting said series of pressure sensitive adhesive taped cards from every three imaged sheets into sets of twenty four in each of four chutes and providing a conveyor to receive said series of pressure sensitive adhesive taped cards in shingled sets within said four chutes and accelerating said conveyors every three sheets to create an open space between said shingled sets so that the four shingled sets contained in said four chutes across said conveyor can be stacked together to make one ninety six card stack.

20. The method of claim 11, using said adjustment mechanism to adjust the length of said flexible deflector.

* * * * *